UNITED STATES PATENT OFFICE.

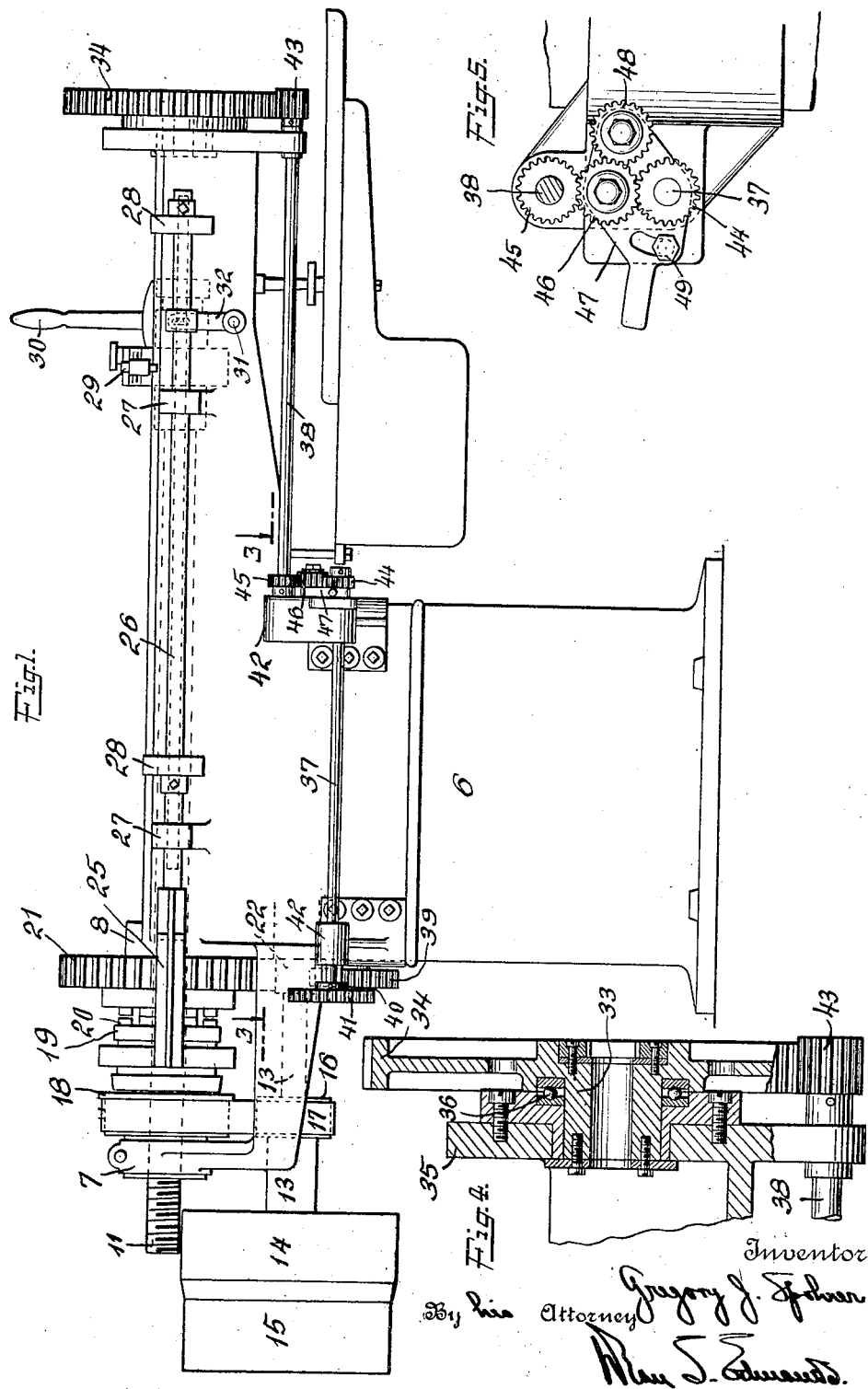

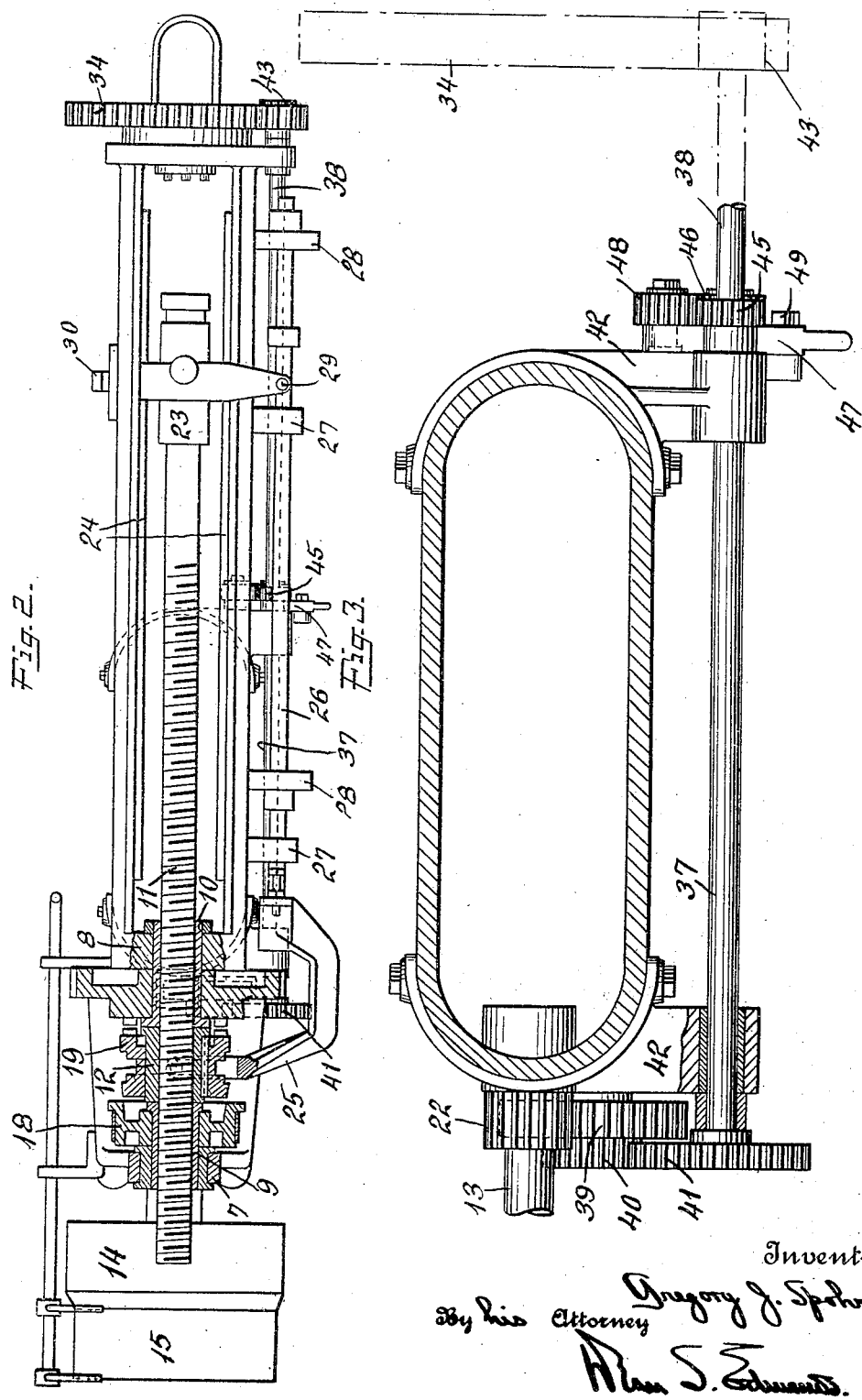

GREGORY J. SPOHRER, OF EAST ORANGE, NEW JERSEY, ASSIGNOR TO HORACE RUSS VAN VLECK, OF MONTCLAIR, NEW JERSEY.

BROACHING-MACHINE.

1,236,782. Specification of Letters Patent. Patented Aug. 14, 1917.

Application filed August 9, 1916. Serial No. 113,878.

*To all whom it may concern:*

Be it known that I, GREGORY J. SPOHRER, a citizen of the United States, residing at East Orange, county of Essex, State of New Jersey, have invented certain new and useful Improvements in Broaching-Machines; and I do hereby declare the following to be a full, clear, and exact description of the invention, such as will enable others skilled in the art to which it appertains to make and use the same.

This invention relates to broaching machines and its object is to provide a machine for broaching a spiral groove or a plurality of spiral grooves upon the interior of a gear, sleeve, tube or similar element.

Broaching machines for cutting such a spiral groove have heretofore been proposed provided with a longitudinally movable member for moving the broaching tool in a straight line and with means for rotating the work during the longitudinal movement of the broaching tool and at a speed bearing a definite relation to the speed of the movement of the broaching tool. In such machines, it is usual to have the broaching tool moved in a straight line by a long screw-threaded bar upon which is an interiorly threaded sleeve, the latter being associated with driving mechanism so that it may be rotated in either direction. Such broaching machines for cutting a spiral groove on the interior of a gear or other element, so far as I am aware, have been unreliable and unsatisfactory, particularly in that the longitudinal movement of the broaching tool and the rotational movement of the work holder have not been so related as to insure an even steady movement of both of these parts under all conditions. One of the features of primary importance in the present invention is the provision of a novel arrangement of the gearing for effecting the longitudinal movement of the broaching tool and the simultaneous rotation of the work holder. One of the distinguishing characteristics of this mechanism is that the rotational movement of the work holder is not effected from the longitudinally moving screw which actuates the broaching tool; instead, the rotational movement of the work holder is effected independently of the longitudinally movable screw and directly from the driving mechanism for the screw, the maintenance of the correspondence between the movement of the screw and the rotation of the work holder being secured by having both of these parts actuated by the same driving mechanism. In this way, a steady longitudinal movement of the broaching tool and a steady rotational movement of the work holder are insured; successive teeth of the broaching tool always take the same path in making the cut through the work and the walls of the groove cut in the work are sharply defined.

Another feature of the mechanism constituting the present invention is the provision of readily operated mechanism for effecting a reversal of the driving gearing of the work holder so that the machine may be quickly adapted for cutting spiral grooves which are either left handed or right handed. Another advantageous characteristic of the mechanism constituting the invention is that changes in the gearing may be quickly made so as to alter the pitch of the spiral cut by the machine.

The preferred embodiment of the invention is illustrated in the accompanying drawings in which—

Figure 1 is an elevation of the machine;

Fig. 2 is a plan view of the same showing certain of the parts in horizontal section;

Fig. 3 is a horizontal section through the base of the machine showing certain of the driving gearing, the section being on line 3—3 of Fig. 1; and Figs. 4 and 5 are detail views hereinafter described.

Referring to these drawings, 6 indicates the base or frame of the machine; the upper end of which is extended in opposite directions. At one end the base is extended upwardly at 7 and 8 and provided with openings to receive bushings 9 and 10. The screw 11 which actuates the broaching tool extends through the bushings and is guided thereby. Between the bushings is a nut 12 which is rotated from the power driven shaft and by its rotation effects longitudinal movement of the screw 11. The power shaft is shown at 13 and is provided with the usual fast and loose pulleys 14 and 15. Shaft 13 also carries a pulley 16 and a belt 17 runs on this pulley and on a pulley 18, which is loosely mounted upon the bushing 9. On one side, the pulley 18 is coned to form one member of a clutch adapted to coact with a corresponding cone at one side of a sleeve 19 which is splined upon the nut 12. At its opposite end, the nut 12 is provided with clutch teeth 20, adapted to coact with similar teeth upon the side of a gear 21, which is loose upon the bushing 10. This gear 21 is in mesh with a pinion 22 mounted upon the power shaft 13. It will be seen that by means of this gearing the sleeve 19 and the nut 12 to which it is splined are rotated in one direction when the sleeve is moved into clutching relation with the pulley 18, and in the other direction when the sleeve is moved to the position for causing engagement of the clutch teeth 20 with the teeth upon the gear 21; also, as the nut 12 is rotated in one direction or the other the screw 11 is moved lengthwise in one direction or the other.

At its end the screw 11 is secured to a carriage 23 which is guided in its movement by ways 24 on the frame of the machine which ways enter grooves in the sides of the carriage 23. The carriage is formed to receive the end of a broaching tool which is secured to the carriage so as to be moved in the direction of its length with the screw 11.

The sleeve 19 is moved upon the nut 12 to one or the other of its clutching positions by a yoke 25 provided with pins which enter a circumferential groove in the sleeve 19. This yoke is fixed to the end of a rod 26 adapted to be moved lengthwise in openings in brackets 27 integral with the casing of the machine. The rod has tappets 28 adjustably mounted thereon and engaged by a projection 29 on the carriage 23 to move the sleeve 19 to the neutral position automatically when the screw 11 has traveled to the end of its range of movement in either direction. The rod 26 may also be actuated manually by means of a handle 30 mounted upon a transverse shaft 31 which carries a crank 32 connected to the rod 26.

The work holder is mounted in line with the screw 24 and in the present machine this work holder is mounted for rotation. It is shown as consisting of a sleeve 33 having a gear 34 formed integral therewith as shown in Fig. 4. The gear and sleeve are mounted upon an upward projection 35 of the frame of the machine and preferably a ball-bearing 36 is provided as shown to take the thrust. The work holder 33 is rotated from the driving mechanism of the machine by which the screw 11 is moved back and forth as in this way a much more steady and reliable rotational movement of the work holder in correspondence with the longitudinal movement of the screw can be obtained than when the rotational movement of the work holder is effected from the screw. For this purpose a counter-shaft is provided connected by suitable gearing to the power shaft 13, and to the gear 34. To facilitate the insertion of reversing gearing the counter-shaft is shown as in two sections 37 and 38. The shaft 37 is connected directly to the power shaft 13 through suitable speed reducing gearing consisting of a gear 39 meshing with the pinion 22 and a pinion 40 mounted upon a stub shaft on the base of the machine and the pinion 40 meshes with a gear 41 on the shaft 37. This shaft rotates in bearings formed in brackets 42 secured to the base of the machine. The shaft 38 is similarly mounted for rotation and at its end it carries a pinion 43 meshing with the gear 34 of the work holder.

At their adjacent ends the shafts 37 and 38 carry gears 44 and 45 which may be connected by an intermediate gear 46 carried by a plate 47 which is loosely mounted upon the shaft 37. The plate also carries a gear 48 which is at all times in mesh with the gear 46. When the parts are in the position shown in Fig. 5, the gear 48 runs idly and the shafts 37 and 38 are connected by the gear 46. By turning the plate 46 about the axis of the shaft 37 the gear 46 is carried out of mesh with gear 45 and gear 48 is carried into mesh with gear 45 so that the connection from the shaft 37 to shaft 38 is made by the two gears 46 and 48 and therefore the direction of rotation of shaft 38 relative to shaft 37 is reversed. Preferably the plate 47 is provided with an arc shaped slot through which a bolt on the bracket 42 projects so that a nut 49 may be tightened up on the bolt to hold the plate 47 in either of its two positions.

In operating the machine, the gear or other element which is to have the spiral gear cut therein is mounted upon the work holder 33 and the broaching tool is mounted in position with its end secured to the carriage 23. Then by shifting the driving belt to the pulley 14 the shaft 13 is set in rotation and the pulley 18 and gear 21 are driven therefrom in opposite directions. Also, the work holder and the work thereon are rotated through the counter shaft consisting of the sections 37 and 38 so that the work holder is driven directly from the driving mechanism of the machine. The operator then moves the handle 30 which acts through the rod 26 and yoke 25 to move the sleeve 19 into clutching relation to either the pulley 18 or gear 21. As one or the other of these two parts is clutched to the sleeve, the latter and the nut 12 are rotated in one direction or the other and the rotation of the nut causes longitudinal movement of the screw 11, the carriage 23, and the broaching tool fixed to the carriage. This longitudinal movement and the simultaneous rotational movement of the work causes the broaching tool to cut a spiral groove in the interior wall of the piece of work and by reason of the arrangement of the gearing for actuating the tool and the work, the movement of these parts is a steady one and the cut in the work is accurate and has well defined walls.

It will be noted that substitutions may be readily made in the train of gearing connecting the power shaft 13 to the counter shaft 37 so as to change the pitch of the spiral cut by the machine. Also, it will be noted that by movement of the handle formed upon the plate 47 the direction of rotation of the work relatively to the power shaft may be reversed so that either a left-handed or a right-handed spiral groove may be cut.

What I claim is:

1. In a broaching machine, the combination of a longitudinally movable screw, means for securing a broaching tool to the screw, an interiorly threaded nut on the screw, driving mechanism, means for connecting the driving mechanism to said nut for rotating the latter in either direction, a rotatable work holder and gearing independent of said screw connecting the work holder to said driving mechanism, whereby the work holder is rotated by the driving mechanism in correspondence with the longitudinal movement of the screw effected by the driving mechanism, but the mechanical connection from the driving mechanism to the work holder does not include the screw; substantially as described.

2. In a broaching machine, the combination of a longitudinally movable screw, means for securing a broaching tool thereto, a nut on the screw, a power shaft, two members driven in opposite directions by the power shaft and means for clutching the said members to said nut, a counter shaft extending parallel to the screw and geared to the power shaft, a rotatable work holder for supporting a piece of work in position for coaction with a broaching tool secured to said screw, and gearing connecting the counter-shaft to the rotatable work holder; substantially as described.

3. In a broaching machine, the combination of a longitudinally movable screw, means for securing a broaching tool to the screw, a driving mechanism, means for connecting the driving mechanism to the screw for moving the latter forward and back in a straight line, a rotatable work holder for supporting a piece of work in position to co-act with the broaching tool, a connection from the driving mechanism independent of said screw to the work holder for causing rotation of the work holder in correspondence with the longitudinal movement of the screw and reversing gearing in said connection for reversing the direction of rotation of the work holder relatively to the driving mechanism; substantially as described.

4. In a broaching machine, the combination of a longitudinally movable screw, means for connecting a broaching tool thereto, a nut on the screw, a power shaft, two members driven in opposite directions by the power shaft, means for clutching either of said members to said nut, a counter-shaft driven by the power shaft, a rotatable work holder driven by the power shaft through said counter-shaft in correspondence with the longitudinal movement of the screw, and reversing gearing associated with the counter-shaft for effecting reversal of the direction of rotation of the work holder relatively to the power shaft; substantially as described.

In testimony whereof, I affix my signature.

GREGORY J. SPOHRER.

Copies of this patent may be obtained for five cents each, by addressing the "Commissioner of Patents, Washington, D. C."